(12) United States Patent
Tschanz et al.

(10) Patent No.: US 7,109,776 B2
(45) Date of Patent: Sep. 19, 2006

(54) GATING FOR DUAL EDGE-TRIGGERED CLOCKING

(75) Inventors: James W. Tschanz, Portland, OR (US); Dinesh Somasekhar, Portland, OR (US); Vivek K. De, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 10/947,869

(22) Filed: Sep. 23, 2004

(65) Prior Publication Data

US 2006/0061400 A1   Mar. 23, 2006

(51) Int. Cl.
*H03K 3/013* (2006.01)
(52) U.S. Cl. ............... 327/298; 327/199; 327/208
(58) Field of Classification Search ........... 327/291, 327/298–299
See application file for complete search history.

(56) References Cited

U.S. PATENT DOCUMENTS

| | | | | |
|---|---|---|---|---|
| 5,557,225 A | * | 9/1996 | Denham et al. | 327/199 |
| 5,760,610 A | * | 6/1998 | Naffziger | 326/93 |
| 6,310,499 B1 | * | 10/2001 | Radjassamy | 327/175 |
| 6,809,570 B1 | * | 10/2004 | Francom | 327/178 |
| 6,853,240 B1 | * | 2/2005 | Nagasue | 327/554 |
| 2002/0073296 A1 | * | 6/2002 | Buch et al. | 711/202 |
| 2004/0239393 A1 | * | 12/2004 | Anshumali et al. | 327/208 |

\* cited by examiner

*Primary Examiner*—Long Nguyen
*Assistant Examiner*—Ryan Jager
(74) *Attorney, Agent, or Firm*—Buckley, Maschoff & Talwalkar LLC (57) ABSTRACT

Some embodiments provide reception of a clock signal, reception of a gating signal, and output of a gated clock signal to a dual edge-triggered-clocked circuit. The gated clock signal is based on the clock signal and on the gating signal.

16 Claims, 7 Drawing Sheets

GATING FOR DUAL EDGE-TRIGGERED CLOCKING

BACKGROUND

Clocking-related elements of an integrated circuit (IC) often consume a significant amount of power. Clocking-related elements may include circuits used for clock generation and clock distribution. Dual edge-triggered (DET) flip-flops have recently been employed to reduce the amount of power consumed by clocking-related elements. DET flip-flops are triggered on the rising edge and on the falling edge of a clock signal. A system using DET flip-flops may provide the same throughput as a single edge-triggered system while operating at half the clock frequency and consuming half the power of the single edge-triggered system.

IC power consumption may be further reduced using clock gating techniques. Clock gating generally consists of disabling the clock signal, and therefore the switching power, to an unused functional block of an IC. Clock gating is usually implemented by clock gating signals and clock gating cells. Conventional clock gating cells are unsatisfactory for use in conjunction with functional blocks employing DET flip-flops.

DETAILED DESCRIPTION

In the following description, particular circuit configurations, logic gates, and signals are described for purpose of illustration. Some embodiments are compatible with other circuit configurations, logic gates, and signals.

Figure 1:
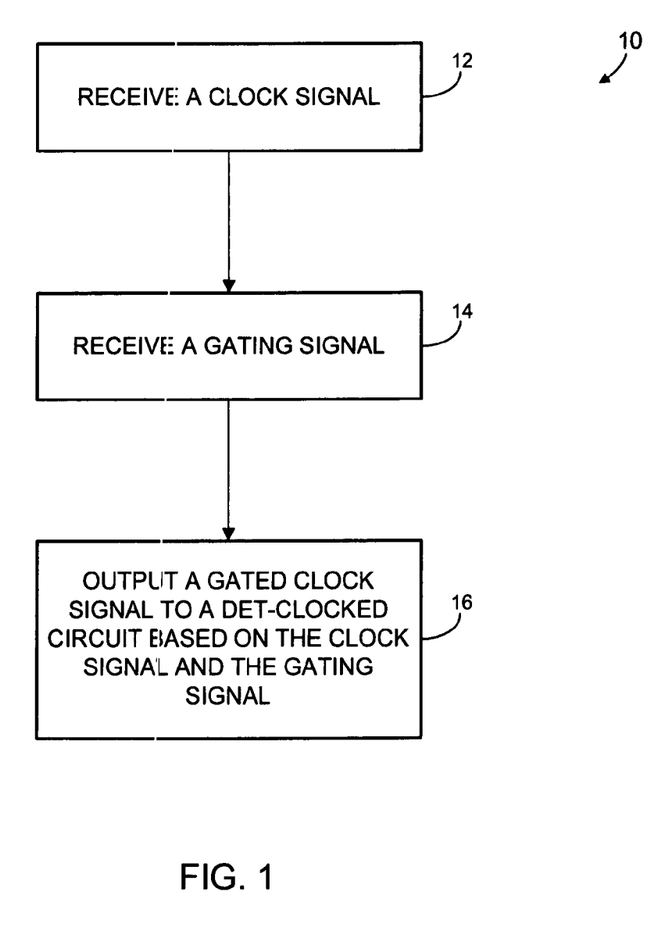
FIG. 1 is a flow diagram of a process to gate a dual edge-triggered-clocked circuit according to some embodiments.

FIG. 1 is a flow diagram of process 10 to gate a clock signal according to some embodiments. Process 10 may be performed by any combination of hardware, firmware, and/or software, and some or all of process 10 may be performed manually. Several implementations of process 10 will be described in detail below.

Initially, a clock signal is received at 12. The clock signal may comprise any amplitude and frequency that is suitable for the particular implementation. A gating signal is then received at 14. The clock signal and the gating signal may be received from a same or different entities. The gating signal may be active high or active low. An "active" gating signal indicates that the clock signal is to be held at a constant value. For example, the gating signal may be an "enable" signal, which may be active low, or a "gate" signal, which may be active high.

Next, at 16, a gated clock signal is output to a DET-clocked circuit based on the clock signal and the gating signal. The gated clock signal may be identical to the clock signal if the gating signal is inactive. As described above, the gated clock signal may be held at a value if the gating signal is active.

According to some embodiments, outputting the gated clock signal at 16 includes detecting a transition of the gating signal from inactive to active, determining if the clock signal is in a first state or in a second state at the transition, holding the gated clock signal at a first value representing the first state if the clock signal is in the first state at the transition, and holding the gated clock signal at a second value representing the second state if the clock signal is in the second state at the transition. Further aspects may include detecting a second transition of the gating signal from active to inactive, determining if the clock signal matches a held value of the gated clock signal after the second transition, and generating the gated clock signal so as to represent the clock signal if the clock signal matches the held value of the gated clock signal after the second transition.

Figure 2:
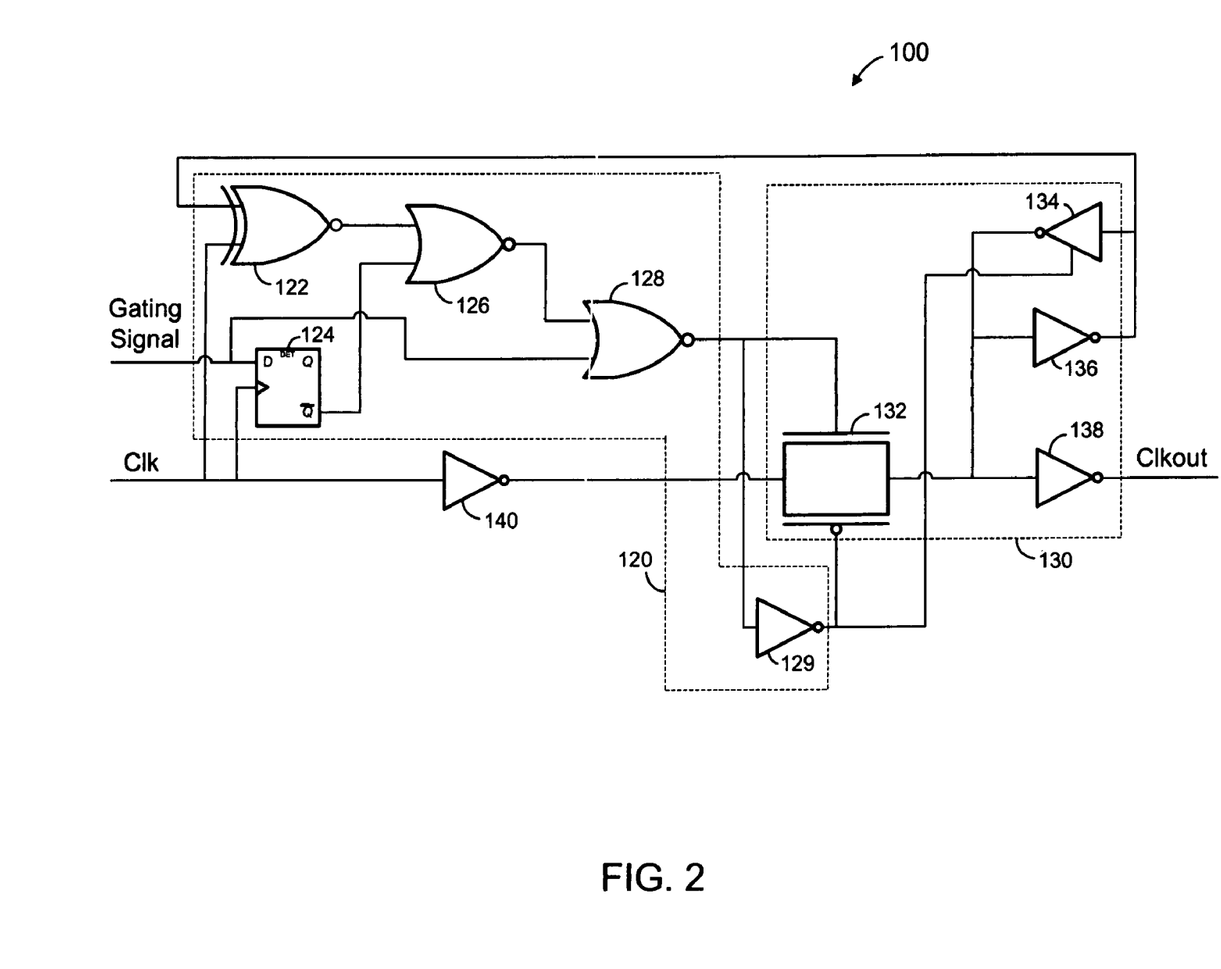
FIG. 2 is a logic diagram of a gating cell according to some embodiments.

FIG. 2 is a logic diagram of gating cell 100 according to some embodiments. Gating cell 100 may reside between a clock-generating circuit and a DET-clocked circuit that is to be gated according to a gating signal. As shown, gating cell 100 receives a clock signal (Clk) and a gating signal (Gating Signal), and outputs a gated clock signal (Clkout). Gating cell 100 may be used to implement process 10 of FIG. 1.

Gating cell 100 comprises evaluation circuit 120 and output circuit 130. Evaluation circuit 120 may determine if the clock signal is in a first state (e.g., high) or in a second state (e.g., low) when the gating signal transitions from inactive to active. Evaluation circuit 120 comprises XNOR gate 122, DET flip-flop 124, NOR gate 126, NOR gate 128, and inverter 129. XNOR gate 122 receives the clock signal and a signal stored by output circuit 130. DET flip-flop 124 receives the clock signal at its clock input terminal and receives the gating signal at its data terminal.

Figure 3:
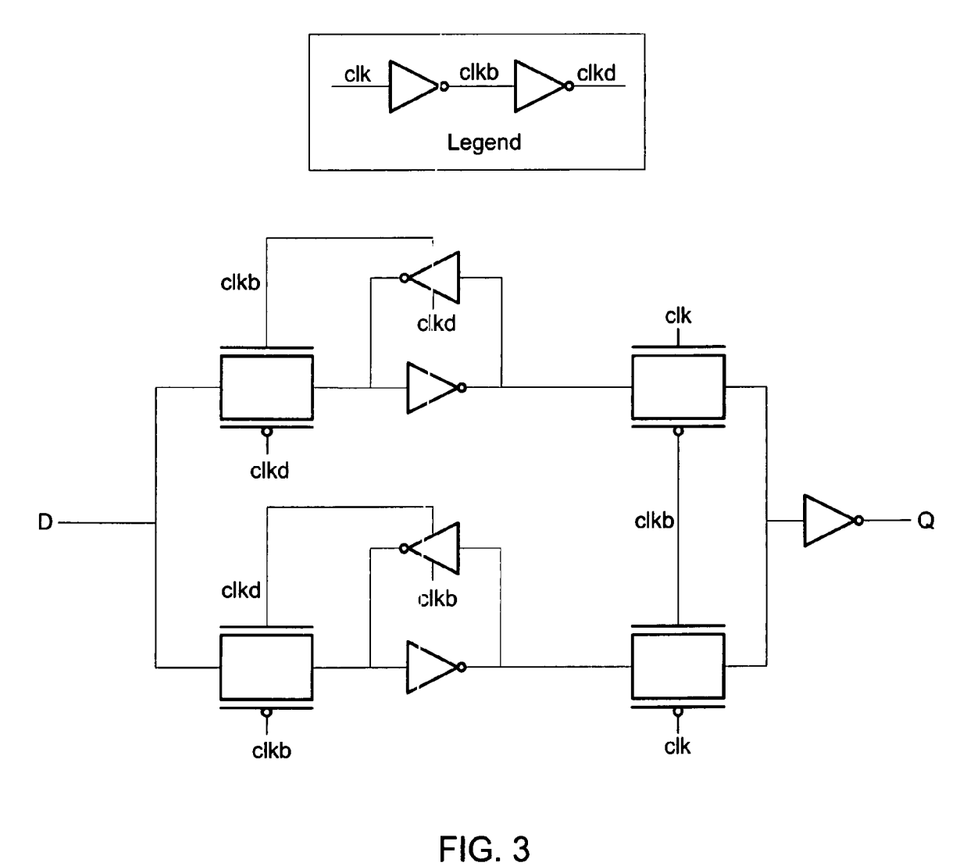
FIG. 3 is a logic diagram of a dual edge-triggered flip-flop according to some embodiments.

FIG. 3 is a logic diagram of a DET flip-flop that may implement DET flip-flop 124 according to some embodiments. Any suitable DET flip-flop design that is or becomes known may be used in conjunction with some embodiments.

Returning to FIG. 2, NOR gate 126 receives the output of XNOR gate 122 and the inverted output of DET flip-flop 124, and outputs a signal to NOR gate 128. NOR gate 128 also receives the gating signal and outputs a signal to output circuit 130 and inverter 129, which in turn outputs a signal to output circuit 130.

Output circuit 130 may operate to hold the gated clock signal at a first value that represents a first state if the clock signal is in the first state when the gating signal transitions from inactive to active, and to hold the gated clock signal at a second value representing a second state if the clock signal is in the second state when the gating signal transitions from inactive to active. Pass gate 132 of output circuit 130 receives the clock signal as inverted by inverter 140 as well as the signals from NOR gate 128 and inverter 129. The output of pass gate 132 is received by a cross-coupled keeper composed of inverters 134 and 136, and by inverter 138. Inverter 138 outputs the gated clock signal.

In one example, the gating signal is low (inactive) during normal operation of the DET-clocked circuit to which gating cell 100 is coupled. Pass gate 132 therefore passes the clock signal, and the gated clock signal is identical to the input clock signal. In some embodiments, output circuit does not include inverter 140 and the gated clock signal is 180 degrees out of phase with the input clock signal.

The gating signal transitions from low to high (active) to gate the input clock signal. As a result, the output of NOR gate 126 goes low and pass gate 132 is disabled. The gated clock signal is therefore held at the value existing at the time the gating signal transitions to high.

The gating signal may transition from high to low to resume delivery of a periodically-transitioning clock signal to the aforementioned DET-clocked circuit. After the transition, evaluation circuit 120 determines if the current value of the clock signal matches the held value of the gated clock signal. If the signals match (e.g., Clk=Clkout), pass gate 132 is enabled and output circuit 130 generates the gated clock signal so as to represent the input clock signal. If the signals do not match, pass gate 132 remains disabled and the gated clock signal is held until the signals match, after which operation proceeds as described above. The input clock signal is compared with the gated clock signal only when the past state of the gating signal was high (active) and the current state is low (inactive). In this regard, DET flip-flop 124 saves the past state of the gating signal.

The foregoing implementation allows the gated clock signal to be stopped (gated) in a low or high state, and to be restarted at the state in which it was stopped. However, if the input clock signal does not match the held state of the gated clock signal when the gating signal goes inactive, restarting of the gated clock signal may be delayed for one clock phase.

Figure 4:
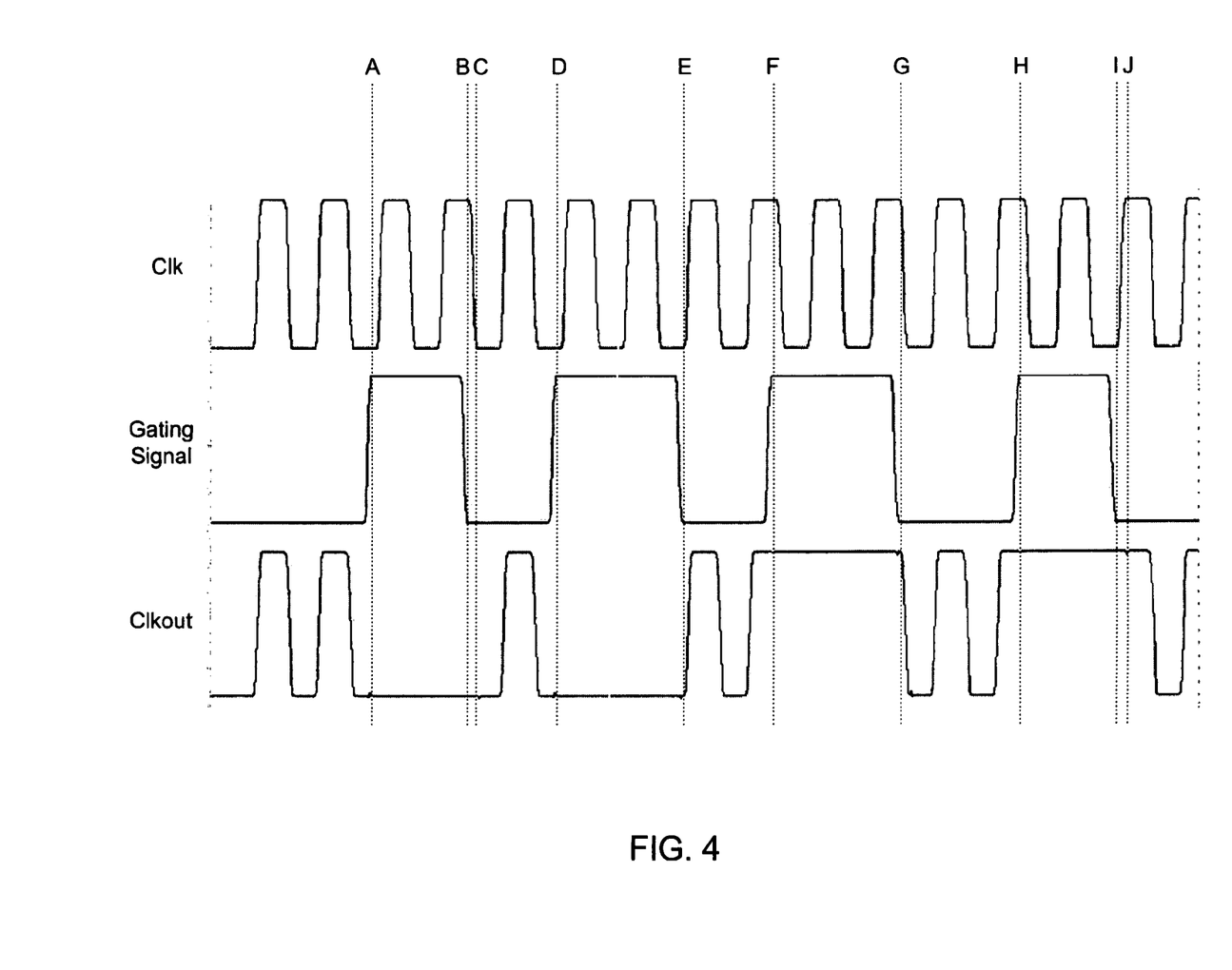
FIG. 4 is timing diagram of a clock signal, a gating signal, and a gated clock signal according to some embodiments.

FIG. 4 illustrates waveforms that correspond to the operation of gating cell 100 according to some embodiments. The waveforms depict the relative states of the clock signal (Clk), the gating signal (Gating Signal), and the gated clock signal (Clkout).

Moving from the left to the right of FIG. 4, the clock signal matches the gated clock signal while the gating signal remains inactive. The gating signal transitions from inactive to active at point A, while the clock signal is low. The gated clock signal is also low at point A, and is thereafter held low due to the disabling of pass gate 132 by the active gating signal.

The gating signal transitions from active to inactive at point B. As described above, evaluation circuit 120 therefore determines whether the value of the clock signal at point B matches the held value of the gated clock signal. This determination is negative in the present example, as the clock signal is high and the gated clock signal is low. Accordingly, pass gate 132 remains disabled and the gated clock signal is held high until point C, at which the value of the clock signal matches the held value of the gated clock signal. Pass gate 132 is enabled at point C and the gated clock signal is generated so as to match the clock signal.

The gating signal is again enabled at point D. The gated clock signal is held low at point D due to the activation of the gating signal. The gating signal transitions from active to inactive at point E. The value of the clock signal matches the held value of the gated clock signal at point E, so pass gate 132 is enabled and output circuit 130 generates the gated clock signal so as to match the clock signal until the gating signal is again enabled at point F.

The gated clock signal is high at point F, and is held high until the gating signal transitions from active to inactive at point G. Again, the value of the clock signal matches the held value of the gated clock signal at point G, so pass gate 132 is enabled and output circuit 130 generates the gated clock signal so as to match the clock signal. The gating signal is again enabled at point H, thereby causing the gated clock signal to be held high.

The gating signal transitions from active to inactive at point I. Evaluation circuit 120 then determines that the value of the clock signal (low) does not match the held value of the gated clock signal (high) at point I. Accordingly, pass gate 132 remains disabled and the gated clock signal is held high until point J, at which the value of the clock signal matches the held value of the gated clock signal. Pass gate 132 is thereafter enabled and the gated clock signal is generated so as to match the clock signal.

Figure 5:
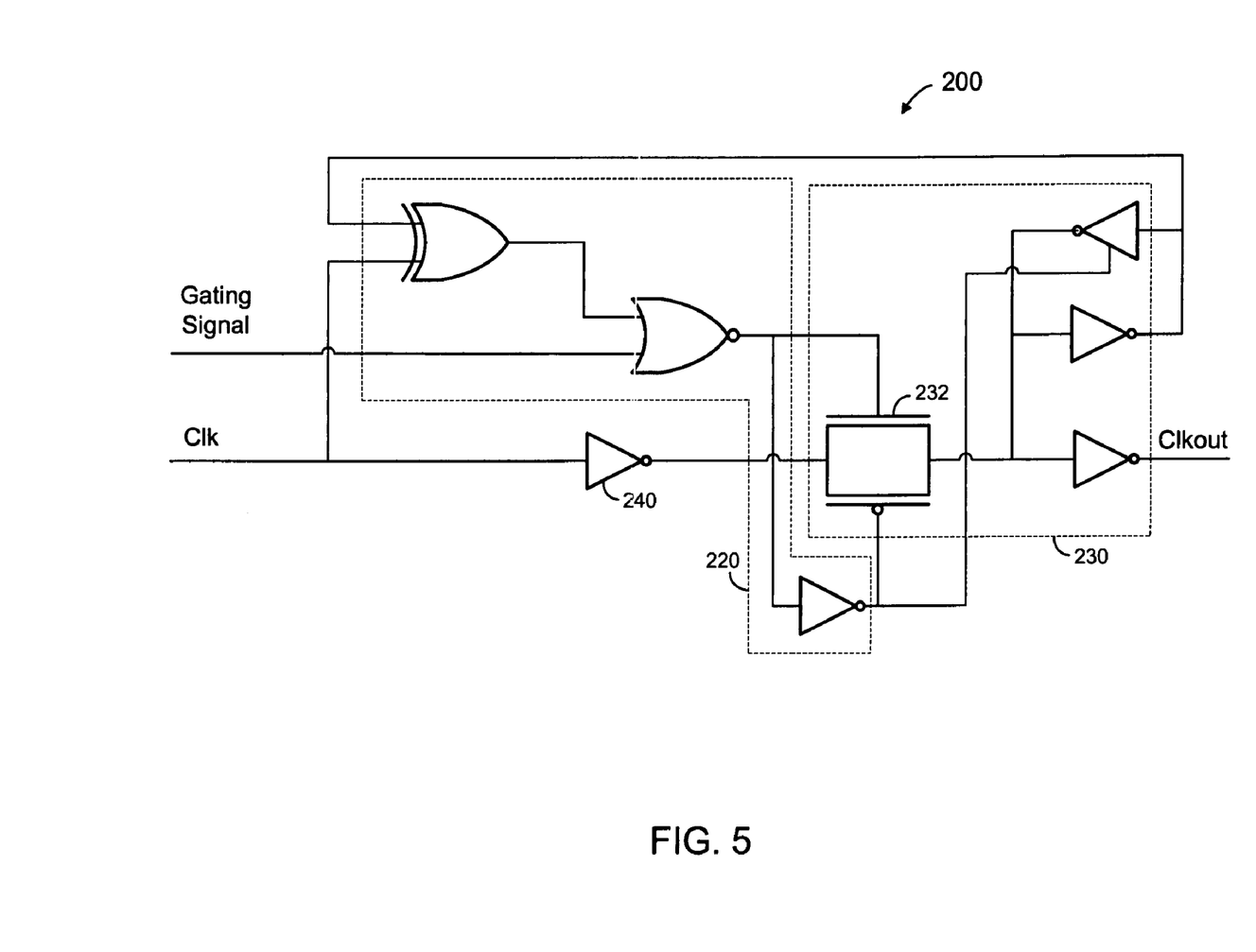
FIG. 5 is a logic diagram of a gating cell according to some embodiments.

FIG. 5 is a logic diagram of gating cell 200 according to some embodiments. Gating cell 200 may reside between a clock-generating circuit and a DET-clocked circuit that is to be gated according to a gating signal.

Gating cell 200 may be used to implement process 10 of FIG. 1. Also, upon deactivation of the gating signal, evaluation circuit 220 may determine whether the input clock signal matches the gated clock signal. If so, evaluation circuit 220 enables pass gate 232 and output circuit 230 generates the gated clock signal to match the input clock signal.

In contrast to gating cell 100, gating cell 200 compares the gated clock signal to the input clock signal at every cycle and not only when the gating signal transitions from active to inactive. Each time the state of the input clock switches, the state of the input clock no longer matches the state of the gated clock signal. This discrepancy may disable pass gate 232 even if the gating signal is inactive. Such a situation may be avoided by sizing the logic gates of gating cell 200 appropriately. If the logic gates of evaluation circuit 220 are significantly slower than pass gate 232, the input clock signal is passed to the output of gating cell 200 before the above-described phenomena can disable pass gate 232.

Gating cell 200 may be designed to operate as shown in FIG. 4. Some embodiments of gating cell 200 may also consume less die space and power than some embodiments of gating cell 100.

Figure 6:
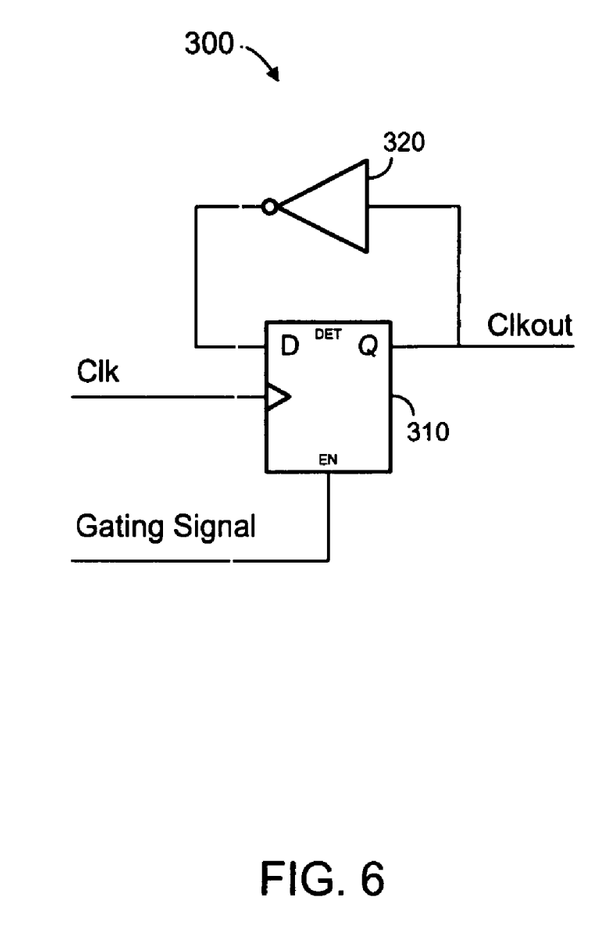
FIG. 6 is a logic diagram of a gating cell according to some embodiments.

FIG. 6 comprises a logic diagram of gating cell 300 according to some embodiments. Gating cell 300 may implement process 10 of FIG. 1.

Gating cell 300 comprises DET flip-flop 310 and inverter 320. DET flip-flop 310 receives a clock signal (Clk) at its clock terminal and a gating signal (Gating Signal) at its enable terminal. The gating signal of FIG. 6 is active low and inactive high. DET flip-flop 310 also outputs a gated clock signal (Clkout) from its output terminal. Inverter 320 is connected to the output terminal and to a data terminal of flip-flop 310 as shown.

Flip-flop 310 comprises an evaluation circuit and an output circuit. In particular, flip-flop 310 determines if the gating signal has transitioned from active to inactive, and generates the gated clock signal so as to represent the clock signal if the gating signal has transitioned from active to inactive.

When the gating signal is inactive, the output of DET flip-flop 310 is inverted at each edge of the input clock signal. This inversion creates an edge on the output gated clock signal. When the gating signal is active, the value of the output gated clock signal is held at its existing value. Next, once the gating signal transitions from active to inactive, the output gated clock signal immediately begins to toggle in response to each received edge of the input clock signal.

In view of the foregoing description, some embodiments of gating cell 300 may exhibit virtually no delay between deactivation of the gating signal and resumption of the gated clock signal. However, in some circumstances, the input clock signal may be 180 degrees out of phase with the gated clock signal. For example, a rising edge of the input clock signal may generate a falling edge on the gated clock signal. Conversely, a rising edge of the input clock signal may sometimes generate a rising edge on the gated clock signal.

Figure 7:
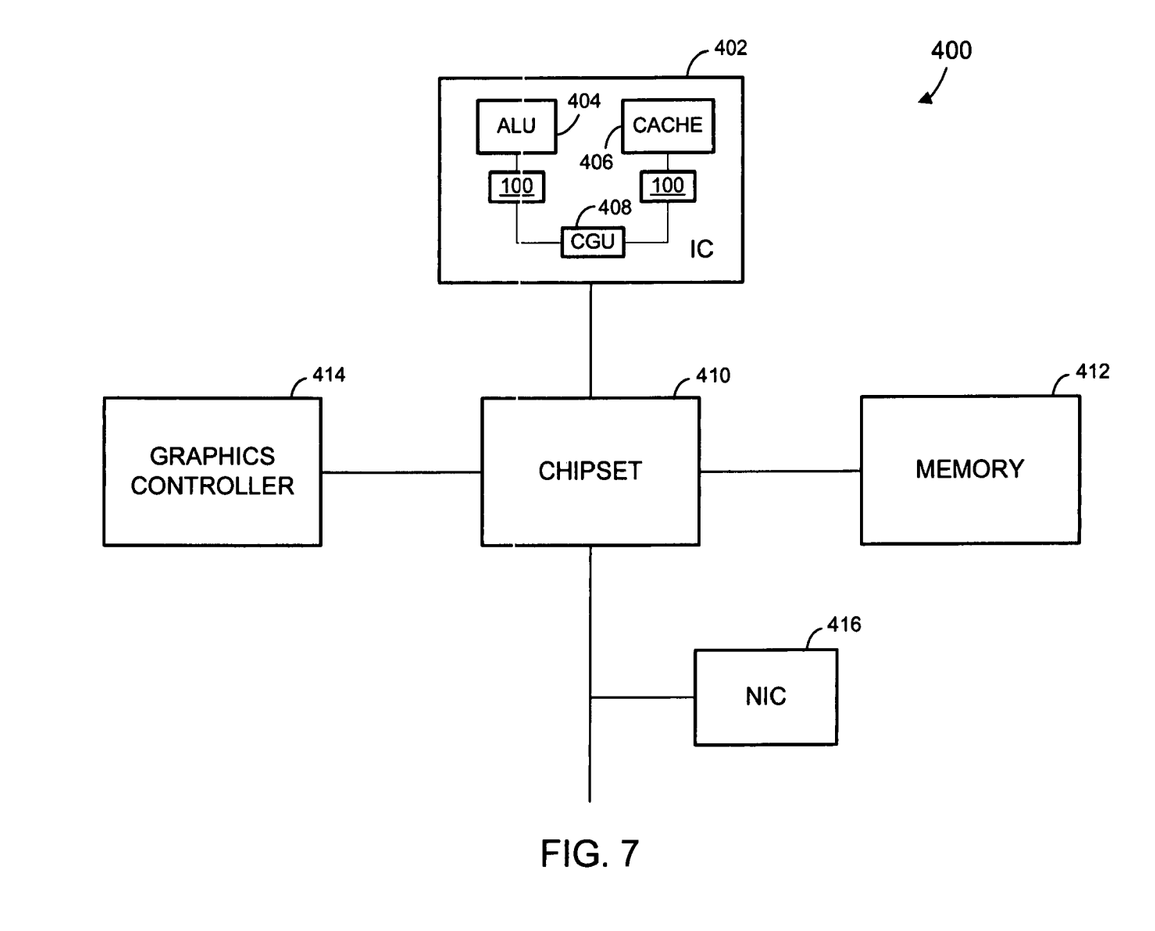
FIG. 7 is a block diagram of a system according to some embodiments.

FIG. 7 illustrates a block diagram of system 400 according to some embodiments. System 400 may comprise components of a desktop computing platform. System 400 includes integrated circuit 402 which may comprise a microprocessor. Some embodiments may be used in conjunction with another type of integrated circuit in a system different from system 400. Integrated circuit 402 comprises sub-blocks such as arithmetic logic unit (ALU) 404, on-die cache 406, and clock generation circuit 408. Integrated circuit 402 also includes two instances of clock gating cell 100 disposed between circuit 408 and each of ALU 404 and cache 406. Each instance of clock gating cell 100 may operate as described above so as to selectively gate clock signals transmitted from clock generation circuit 408 to ALU 404 and cache 406.

Integrated circuit 402 may be coupled to chipset 410 for communication with memory 412, graphics controller 414 and network interface card 416. Memory 412 may comprise any type of memory for storing data, such as a Single Data Rate Random Access Memory, a Double Data Rate Random Access Memory, or a Programmable Read Only Memory.

The several embodiments described herein are solely for the purpose of illustration. Other embodiments may use any combination of hardware, software, and logic gates to implement the processes described herein. Therefore, persons in the art will recognize from this description that other embodiments may be practiced with various modifications and alterations.

What is claimed is:

1. A clock gating circuit comprising:
   a first input to receive a clock signal;
   a second input to receive a gating signal;
   an output to output a gated clock signal to a dual edge-triggered-clocked circuit;
   an evaluation circuit to determine if the clock signal is in a first state or a second state in response to a transition of the gating signal from inactive to active, and to determine if the clock signal matches a held value of the gated clock signal in response to a transition of the gating signal from active to inactive; and
   an output circuit to hold the gated clock signal at a first value representing the first state if the clock signal is active during the transition of the gating signal from inactive to active, to hold the gated clock signal at a second value representing the second state if the clock signal is inactive during the transition of the gating signal from inactive to active, and to generate the gated clock signal so as to represent the clock signal only if the clock signal is determined to match the held value of the gated clock signal.

2. A circuit according to claim 1,
   the evaluation circuit comprising:
      an XNOR gate to receive the clock signal and to output an XNOR signal;
      a dual edge-triggered D flip-flop to receive the clock signal and the gating signal and to output a latch signal;
      a first NOR gate to receive the XNOR signal and the latch signal and to output a first NOR signal; and
      a second NOR gate to receive the gating signal and the first NOR signal and to output a second NOR signal; and
   the output circuit comprising:
      a pass gate to receive the clock signal, the second NOR signal and an inverted second NOR signal, and to output or block the clock signal based on the second NOR signal and the inverted second NOR signal; and
      a storage circuit coupled to an input of the XNOR gate, the storage circuit to receive the output clock signal and to store the output clock signal.

3. A circuit according to claim 1,
   the evaluation circuit comprising:
      an XOR gate to receive the clock signal and to output an XOR signal; and
      a NOR gate to receive the XOR signal and the gating signal and to output a NOR signal; and
   the output circuit comprising:
      a pass gate to receive the clock signal, the NOR signal and an inverted NOR signal, and to output or block the clock signal based on the NOR signal and the inverted NOR signal; and
      a storage circuit coupled to an input of the XOR gate, the storage circuit to receive the output clock signal and to store the output clock signal.

4. A circuit according to claim 1, the evaluation circuit to determine if the gating signal has transitioned from active to inactive, and
   the output circuit to generate the gated clock signal so as to represent the clock signal if the evaluation circuit determines that the gating signal has transitioned from active to inactive.

5. A circuit according to claim 4, wherein the generated gated clock signal is 180 degrees out of phase with the clock signal.

6. A method comprising:
   receiving a clock signal;
   receiving a gating signal;
   outputting a gated clock signal to a dual edge-triggered-clocked circuit;
   detecting a transition of the gating signal from inactive to active;
   in response to detecting the transition of the gating signal from inactive to active, determining if the clock signal is in a first state or in a second state at the transition;
   holding the gated clock signal at a first value representing the first state if the clock signal is in the first state at the transition;
   holding the gated clock signal at a second value representing the second state if the clock signal is in the second state at the transition;
   detecting a second transition of the gating signal from active to inactive;
   in response to detecting the transition of the gating signal from active to inactive, determining if the clock signal matches a held value of the gated clock signal at the second transition; and
   generating the gated clock signal so as to represent the clock signal only if the clock signal matches the held value of the gated clock signal at the second transition.

7. A method according to claim 6, further comprising:
   if the clock signal does not match the held value of the gated clock signal after the second transition, holding the gated clock signal at the held value until the clock signal matches the held value of the gated clock signal after the second transition.

8. A method according to claim 6, further comprising:
detecting a second transition of the gating signal from active to inactive, and
generating the gated clock signal so as to represent the clock signal if the gating signal has transitioned from active to inactive.

9. A method according to claim 8, wherein the generated gated clock signal is 180 degrees out of phase with the clock signal.

10. A system comprising:
a chipset; and
a die comprising a microprocessor in communication with the chipset, wherein the microprocessor comprises a logic block comprising:
a first input to receive a clock signal;
a second input to receive a gating signal;
an output to output a gated clock signal to a dual edge-triggered-clocked circuit;
an evaluation circuit to determine if the clock signal is in a first state or a second state in response to a transition of the gating signal from inactive to active, and to determine if the clock signal matches a held value of the gated clock signal in response to a transition of the gating signal from active to inactive; and
an output circuit to hold the gated clock signal at a first value representing the first state if the clock signal is in the first state during the transition of the gating signal from inactive to active, to hold the gated clock signal at a second value representing the second state if the clock signal is in the second state during the transition of the gating signal from inactive to active, and to represent the clock signal only if the clock signal is determined to match the held value of the gated clock signal.

11. A system according to claim 10,
the evaluation circuit comprising:
an XNOR gate to receive the clock signal and to output an XNOR signal;
a dual edge-triggered D flip-flop to receive the clock signal and the gating signal and to output a latch signal;
a first NOR gate to receive the XNOR signal and the latch signal and to output a first NOR signal; and
a second NOR gate to receive the gating signal and the first NOR signal and to output a second NOR signal; and
the output circuit comprising:
a pass gate to receive the clock signal, the second NOR signal and an inverted second NOR signal, and to output or block the clock signal based on the second NOR signal and the inverted second NOR signal; and
a storage circuit coupled to an input of the XOR gate, the storage circuit to receive the output clock signal and to store the output clock signal.

12. A system according to claim 1,
the evaluation circuit comprising:
an XOR gate to receive the clock signal and to output an XOR signal; and
a NOR gate to receive the XOR signal and the gating signal and to output a NOR signal; and
the output circuit comprising:
a pass gate to receive the clock signal, the NOR signal and an inverted NOR signal, and to output or block the clock signal based on the NOR signal and the inverted NOR signal; and
a storage circuit coupled to an input of the XOR gate, the storage circuit to receive the output clock signal and to store the output clock signal.

13. A system according to claim 10, the evaluation circuit to determine if the gating signal has transitioned from active to inactive, and
the output circuit to generate the gated clock signal so as to represent the clock signal if the evaluation circuit determines that the gating signal has transitioned from active to inactive.

14. A system according to claim 13, wherein the generated gated clock signal is 180 degrees out of phase with the clock signal.

15. A system according to claim 13,
the evaluation circuit and the output circuit comprising a dual edge-triggered D flip-flop, a clock input of the D flip-flop to receive the clock signal, and an enable input of the clock signal to receive the gating signal, and
the logic block further comprising:
an inverter, and input of the inverter coupled to an output of the D flip-flop and an output of the inverter coupled to an input of the D flip-flop.

16. A circuit according to claim 4,
the evaluation circuit and the output circuit comprising a dual edge-triggered D flip-flop, a clock input of the D flip-flop to receive the clock signal, and an enable input of the clock signal to receive the gating signal, and
the circuit further comprising:
an inverter, and input of the inverter coupled to an output of the D flip-flop and an output of the inverter coupled to an input of the D flip-flop.

* * * * *